3,452,118
SELECTIVELY HYDROCHLORINATED BLOCK COPOLYMERS
De Loss E. Winkler, Orinda, and Alfred W. Shaw, Moraga, Calif., assignors to Shell Oil Company, New York, N.Y., a corporation of Delaware
No Drawing. Filed Sept. 23, 1964, Ser. No. 398,743
Int. Cl. C08f *45/68, 25/00*
U.S. Cl. 260—879                                               4 Claims

ABSTRACT OF THE DISCLOSURE

Selectively hydrochlorinated block copolymers are disclosed. These block copolymers are those having the general structure A—B—A, wherein each A is a polymer block of a branched conjugated diene having 5–8 carbon atoms per molecule, and B is a polymer block of an unbranched conjugated diene having 4–8 carbon atoms per molecule, and wherein 50–100% of the double bonds of block A are hydrochlorinated and 0–50% of the double bonds B are hydrochlorinated.

---

This invention is concerned with the selective hydrochlorination of certain block copolymers. More particularly, it is directed to the preparation of solvent resistant highly adhesive self-adhering block copolymers of certain defined classes of conjugated dienes.

The hydrochlorination of synthetic rubber and other rubbers have been studied in some detail. These products have been prepared for utilities such as the preparation of moisture proof coatings and the like.

Recent developments in the preparation of elastomers has resulted in the formation of certain block copolymers. Of these, the most important category is that having the properties of so called "self-curing" elastomers. By this is meant a particular type of block copolymer having the physical characteristics (apart from sensitivity to certain solvents) of vulcanized rubbers. Typical of these are some of the block copolymers having the general configuration polystyrene-polyisoprene-polystyrene wherein the ratio of average molecular weights of the terminal polymer blocks to that of the center elastomeric polymer blocks is such that the self-curing properties are readily apparent. These products are particularly useful for the preparation of adhesives, coatings, elastic threads, and other purposes where vulcanization is either awkward, undesirable or expensive.

Other blocks copolymers have been prepared wherein each of the polymer blocks is composed primarily of certain conjugated dienes. These, however, do not have the self-curing property of the class just described hereinbefore. It appears to be necessary that the terminal polymer blocks have the general properties of thermoplastics rather than of elastomers in order to impart self-curing properties to block copolymers.

It is an object of the present invention to provide improved block copolymers. It is a further object of the invention to provide block copolymers having self-curing properties. It is a particular object of the invention to provide selectively hydrochlorinated block copolymers. Other objects will become apparent during the following detailed description of the invention.

Improved self-curing block copolymers are provided with comprise selectively hydrochlorinated block copolymers, the copolymer prior to hydrochlorination having the general configuration

A—B—A wherein each A is a polymer block of certain branched chain conjugated diene having from 5–8 carbon atoms per molecule and B is a polymer block of an unbranched (straight chain) conjugated diene having 4–6 carbon atoms per molecule, 50–100% of the unsaturated linkages of the blocks A having been hydrochlorinated, while only 0–50% of the double bonds of the polymer block B are hydrochlorinated. It has been the findings in accordance with this invention, that the selective hydrochlorination of the block copolymer results in the formation of a self-curing thermoplastic elastomeric hydrochlorination product of the original A—B—A block copolymer, the original polymer being a typical conjugated diene ealstomer having the properties of an uncured rubber. The hydrochlorination of the terminal blocks A, in effect, might be regarded as a vulcanizing alternative although the terms is not entirely correct, since cross-linking does not apparently occur.

Still in accordance with the present invention, a process is provided for the operation of such selectively hydrochlorinated block copolymers which comprises subjecting a solution of the copolymer in an essentially inert hydrochlorinating solvent at temperatures between $-20°$ C. and $+75°$ C., preferably between about $+30°$ C. and $-10°$ C. In order to provide the maximum degree of selectivity desired, wherein the center block B is essentially free of hydrochlorination, the process should be conducted at pressures less than about 5 atmospheres of hydrogen chloride, preferably less than 2 atmospheres. However, since elastomeric properties of the hydrochlorinated product are exhibited if no more than about 50% of the double bonds of block B are hydrochlorinated, it is possible to utilize condition, such as 5–50 atmospheres pressure of hydrogen chloride, whereby such limited hydrochlorination occurs.

Moreover, the process should be conducted in the effective absence of molecular oxygen so as to avoid degradation of the polymer which might otherwise occur. The time of hydrochlorination will vary with the precise nature of the polymer, the degree of hydrochlorination desired, the solvent employed, the presence or absence of catalysts, the temperature, etc., but normally will be between about 1 hour and 1 week. Expressing the selective structure of the hydrochlorinated block copolymer in other terms, it can be stated that the blocks A bear hydrogen and chloride atoms in an amount of 50–100% of the theoretically possible content based on the original unsaturation of these blocks, while the block B is essentially a hydrocarbon block being virtually unaltered in any respect from the structure or chemical content of the block prior to the hydrochlorination treatment or, on the other hand may contain up to 50% of the theoretically possible amount of hydrogen and chlorine atoms.

The elastomeric block copolymers from which the selective hydrohalogenated derivatives are prepared have the general configuration

A—B—A wherein each A is an independently selected polymer block of certain branched chain conjugated dienes having 5–8 carbon atoms per molecule the average molecular weight of each block A being between about 10,000 and 45,000; B is a polymer block of a straight chain conjugated diene having 4–6 carbon atoms per molecule, the average molecular weight of block B being between about 35,000 and 150,000 (preferably 50,000–125,000) the weight of the blocks being A less than about 38% (preferably less than about 35%) of the total weight of the copolymer.

The branched conjugated dienes from which blocks A are prepared bear an alkyl radical on at least one of the carbon atoms bearing a double bond. Thus, they have the general configuration

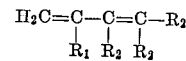

wherein $R_1$ is an alkyl and each $R_2$ is either hydrogen or alkyl. Isoprene is preferred for the formation of blocks A, while butadiene is preferred for block B.

The term "block copolymers" from which the selective hydrochlorinated products are prepared, being composed substantially entirely of conjugated diene monomers, have properties resembling those of an unvulcanized rubber. Consequently, they normally require vulcanization during their processing and use in order to achieve the desirable properties of a vulcanized rubber product. The hydrochlorination selectively applied thereto in accordance to the present invention replaces the vulcanization requirement and results in processing benefits which cannot be achieved when vulcanization is required in similar products.

The above-recited molecular weight limits relative to each of the polymeric blocks A and B, respectively, are chosen in order to result in a self-curing elastomeric product following hydrochlorination having a maximum combination of desired physical properties.

The present invention is based upon the discover of the limitations imposed upon the types of monomers with which suitable block copolymers may be prepared, the critically defined molecular weights of the several blocks and the relationship of molecular weight of the end blocks to that of the center blocks as well as the degree of hydrochlorination of the individual blocks required to impart the self-curing properties desired. Broadly viewed, the objective of selective hydrochlorination of the terminal blocks is to convert these blocks to hydrochlorinated derivatives having essentially thermoplastic resin like properties, while the center block is maintained in elastomeric condition to provide the elastomeric properties desired in the final derivative products.

Within the broad area of possibility of ratios of the two types of conjugated dienes in their specified block positions, experts in the rubber art will realize that a variety of products may be obtained. The object was to determine the molecular weight range and degree of hydrochlorination required in which a group of compositions exists combining an optimum number of desirable physical properties; in this case, the properties of a thermoplastic rubber which does not require vulcanization and which can be readily shaped by forming operations commonly employed for thermoplastics. This is of special economic advantage as compared with the use of elastomers which required vulcanization. In the ordinary course of processing the latter type of rubbers, it is necessary to discard or merely use as scrap a substantial part of the product which has been vulcanized during or prior to processing such as in molding and the like. Vulcanizing results in improved elastomeric properties but at the same time results in a rubber which cannot be reworked except as ground up scrap, which is a mere extender for other rubbers.

The limitations imposed by the end uses and processing equipment involved in the preparation of useful articles of this type are low tensile strength, which results if the terminal polymer blocks A are of too low a molecular weight, resulting in a low tensile strentgh of the resulting block copolymer even after hydrochlorination. On the other hand, if the average molecular weight of the terminal polymer blocks A is excessively high, only rigid resins of low extensibility are obtained. Even when this average molecular weight is reduced somewhat but still outside the recited ranges, after hydrochlorination, the resulting block copolymers are stiff elastomers with a tensile yield point. Finally, the average molecular weight of the elastomeric middle block B is limited by the finding that if this average molecular weight is excessive, then an area of poor processability is entered making it difficult to process and handle as well as mold or otherwise convert the hydrochlorinated products. The high degree of hydrochlorination of the blocks A is due to the requirement of forming relatively non-elastomeric blocks, while the low degree of hydrochlorination of the center block B is governed by the necessity for maintaining elastomeric properties in the converted product.

In accordance with the objectives of the present invention, the subject block copolymers are selectively hydrochlorinated in order to convert the terminal polymer blocks A to hydrochlorinated blocks resembling thermoplastic resins. Not only is this objective achieved, but the resulting selectively hydrochlorinated products have substantially higher resistance to swelling and solution in numerous solvents, particularly hydrocarbons, than is found either with the parent block copolymers or with the corresponding self-vulcanizing block copolymers of which the type polystyrene-polyisoprene-polystyrene is typical.

The process of this invention comprises treatment of the subject block copolymers with hydrogen chloride under selected conditions such that a high degree hydrochlorination occurs in the terminal polymer blocks (comprising substantially only polymers of branched conjugated dienes such as isoprene or 2,3-dimethyl butadiene) while no more than 50% of theoretical hydrochlorination of the center block B occurs. In this process, it is essential to select conditions such that hydrochlorination beyond 50% of theoretical does not take place within the center block of unbranched conjugated dienes (such as polymers of butadiene, pentadiene, hexadiene, etc.). It is necessary to limit the conditions so as to maintain the elastomeric character of the final product while at the same time improving its solvent resistance and while converting it from an ordinary elastomer to one having the properties of a vulcanized rubber.

With these considerations in mind, it is preferred to hydrochlorinate the block copolymers selectively at temperatures between $+75°$ C. and $-20°$ C., preferably between about $20°$ C. and $-10°$ C. in the virtual absence of molecular oxygen and under pressures above about 0.1 atmospheres but less than about 5 atmospheres of hydrogen chloride whereby 50–100% of the unsaturated linkages of the terminal blocks A are saturated with hydrogen and chlorine atoms, the block B being substantially unaltered. In order to hydrochlorinate the middle block B up to 50% of theoretical, the hydrogen chloride pressure must be increased to 5–50 atmospheres. While the time of hydrochlorination will depend upon a number of factors such as the specific block copolymer, the solvent employed, the presence or absence of catalysts, the pressure and other factors, the time of hydrochlorination will generally be between about 1 hour and 1 week, usually between about 4 hours and 2 days.

The hydrochlorination is to be carried out in an essentially inert solvent by which is meant a solvent which does not hydrochlorinate or react with the block copolymer under the conditions of hydrochlorination. Such solvents include particularly hydrocarbons and halogenated derivatives thereof such as toluene, benzene, chlorobenzene, butane, hexane, heptane, ethyl chloride, dichloro ethane, and carbon tetrachloride. The hydrogen halide is normally present in amounts between 0.5 and about 3 weight percent based on the entire reaction mixture, and expressed in other terms, between about 10% and 60 weight percent based on the block copolymer.

Another method by which the block copolymers may be at least superficially selectively hydrohalogenated is to subject the parent block copolymer to a forming operation, such as the formation of thin film elastic fiber and the like and thereafter subjecting it to an atmosphere of gaseous hydrogen chloride or to a solution of hydrogen chloride under such conditions that selective hydrohalogenation occurs without appreciable degradation of the polymer, while maintaining the physical form such as film and the like of the polymer.

The following examples illustrate the present invention:

EXAMPLE I

A block copolymer having the structure polyisoprene-polybutadiene-polyisoprene wherein the block molecular weight were 22,000–82,000–31,000, was utilized for this test. One hundred and ten grams of the block copolymer were dissolved in 1,200 grams of benzene and 1,390 grams cyclohexane modified with 200 milliliters of tetrahydrofuran. The mass was purged with nitrogen to remove any molecular oxygen which might have been present, after which the cement was cooled in ice and saturated with hydrogen chloride at about one atmosphere pressure. After 5 days, unreacted HCl was removed by purging with $N_2$ at 60–65° C. and by evaporation of solvent. It was found to contain 13.5% by weight of chlorine and had a molecular weight of about 139,000, as compared with the original molecular weight of about 117,000, indicating that essentially no degradation had occurred. Block copolymer having the general configuration

A—B—A wherein each A is a polymer block of a branched conjugated diene having 5–8 carbon atoms per molecule, said diene having the general formula $$H_2C=C-C=C-R_2$$
$$\phantom{H_2C=}|\phantom{-C}|\phantom{=C}|$$
$$\phantom{H_2C=}R_1\phantom{-}R_2\phantom{=}R_2$$

wherein $R_1$ is an alkyl radical and each $R_2$ is a member of the group consisting of hydrogen atoms and alkyl radicals, and B is a polymer block of an unbranched conjugated diene having 4–8 carbon atoms per molecule.

Prior to hydrochlorination, the block copolymer had the poor tensile properties of an unvulcanized conjugated diene rubber. After hydrochlorination, solution-cast specimens had the following properties at 23° C.:

| | |
|---|---|
| Tensile strength at break, p.s.i. | 3075 |
| 300% modulus, p.s.i. | 525 |
| 500% modulus, p.s.i. | 725 |
| Elongation at break, percent | 980 |
| Set at break, percent | 10 |

EXAMPLE II

The same conditions of hydrochlorination were applied to the treatment of a second block copolymer having the structure polyisoprene-polybutadiene-polyisoprene, the block molecular weights being 4,500–7,350–4,500. After one week at room temperature and one atmosphere of gaseous HCl, the recovered product was found to contain 5.6 percent chlorine.

EXAMPLE III

A third block copolymer having the structure polyisoprene-polybutadiene-polyisoprene wherein the block molecular weights were 9,000–78,000–8,000 was likewise hydrochlorinated at room temperature for one week was found to contain 8.9 percent chlorine.

The products of Examples 1–3 all exhibited the outstanding stress-strain properties typified by the physical data given for the product of Example I. The hydrochlorination was directed almost exclusively to the polyisoprene blocks and these blocks were substantially saturated at the double bonds with hydrogen and chlorine.

EXAMPLE IV

The products of Examples 1–3 exhibited substantially improved mechanical properties and resistance to the effects of organic solvents was materially improved. The limited hydrogen chloride pressure made the hydrochlorination so highly selected relative to the polyisoprene polymer blocks to the exclusion of any hydrochlorination of the butadiene blocks. Therefore, an effort was made to effect a limited amount of hydrochlorination of the polybutadiene blocks by increasing the hydrogen chloride pressure. Thus, by treatment of the block copolymer of Example I for two hours at 300 pounds hydrogen chloride pressure at room temperature, a product was obtained which contained 23.2% chlorine. The block copolymer of Example II was treated at room temperature under 300 pounds per square inch of anhydrous hydrogen chloride, resulting after one hour in a product having 13.5% chlorine and after three hours treatment a chlorine content of 19.9%. Finally, the block copolymer of Example III was treated at room temperature with 300 pounds per square inch anhydrous chloride, resulting in a chlorine content of 14.9% after one hour of treatment and 21.0% chlorine after three hours of treatment. These analyses indicate that a limited amount of hydrochlorination of butadiene polymer block occurred after substantially complete hydrochlorination of the polyisoprene blocks.

We claim as our invention:

1. A hydrochlorinated block copolymer having the general configuration

A—B—A wherein each A is a polymer block of a branched conjugated diene having 5–8 carbon atoms per molecule, said diene having the general formula $$H_2C=C-C=C-R_2$$
$$\phantom{H_2C=}|\phantom{-C}|\phantom{=C}|$$
$$\phantom{H_2C=}R_1\phantom{-}R_2\phantom{=}R_2$$

wherein $R_1$ is an alkyl radical and each $R_2$ is a member of the group consisting of hydrogen atoms and alkyl radicals, and B is a polymer block of an unbranched conjugated diene having 4–8 carbon atoms per molecule, wherein 50–100% of the double bonds of blocks A are hydrochlorinated and 0–50% of the double bonds of block B are hydrochlorinated.

2. A solid elastomeric partially hydrochlorinated block copolymer of isoprene and butadiene, said copolymer having the general configuration

A—B—A wherein each A is a polyisoprene block and B is a polybutadiene block, between about 50 and 100% of the unsaturated bonds of the polyisoprene blocks being hydrochlorinataed, the polybutadiene block being essentially free of hydrochlorination.

3. A hydrochlorinated block copolymer according to claim 2 wherein each polyisoprene block has an average molecular weight between about 10,000 and about 45,000 and the polybutadiene block has an average molecular weight between about 35,000 and about 150,000.

4. A hydrochlorinated block copolymer according to claim 1 wherein the center block B is substantially free of hydrochlorination.

References Cited

UNITED STATES PATENTS

| | | | |
|---|---|---|---|
| 3,251,905 | 5/1966 | Lelinski | 260—879 |
| 3,265,765 | 8/1966 | Holden et al. | 260—879 |

FOREIGN PATENTS 909,672  10/1962  Great Britain.

OTHER REFERENCES

D'Tanni et al.: Ind. and Eng. Chem. 38, p. 1180 (1946) (copy in Group 140).

MURRAY TILLMAN, *Primary Examiner.*

C. J. SECCURO, *Assistant Examiner.*

U.S. Cl. X.R.

260—82.1, 94.7